(12) United States Patent
Kaneichi

(10) Patent No.: US 11,657,446 B2
(45) Date of Patent: May 23, 2023

(54) INFORMATION PROCESSING APPARATUS FOR GENERATING A VEHICLE OPERATION PLAN IN A PLURALITY OF DIFFERENT RENTAL MODES

(71) Applicant: TOYOTA JIDOSHA KABUSHIKI KAISHA, Toyota (JP)

(72) Inventor: Daiki Kaneichi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 16/931,601

(22) Filed: Jul. 17, 2020

(65) Prior Publication Data

US 2021/0118043 A1 Apr. 22, 2021

(30) Foreign Application Priority Data

Oct. 17, 2019 (JP) ................................ JP2019-190379

(51) Int. Cl.
*G06Q 30/06* (2023.01)
*G06Q 10/06* (2023.01)
(Continued)

(52) U.S. Cl.
CPC ..... *G06Q 30/0645* (2013.01); *G06Q 10/0633* (2013.01); *G06Q 10/06316* (2013.01); *G07C 5/02* (2013.01)

(58) Field of Classification Search
CPC ......... G06Q 30/0645; G06Q 10/06316; G06Q 10/0633; G06Q 10/02; G06Q 10/0631;
(Continued)

(56) References Cited

U.S. PATENT DOCUMENTS

2002/0052813 A1* 5/2002 Kinugawa .............. G06Q 50/06
705/34
2003/0139875 A1* 7/2003 Baiada ................ G08G 5/0043
342/36
(Continued)

FOREIGN PATENT DOCUMENTS

CN 104617591 A * 5/2015
CN 106507315 A * 3/2017
(Continued)

OTHER PUBLICATIONS

Luis Barreto, Urban Mobility Digitalization: Towards Mobility as a Service (MaaS), 2018, International Conference on Intelligent Systems (IS), pp. 850-855. (Year: 2018).*
(Continued)

*Primary Examiner* — Tan D Nguyen
(74) *Attorney, Agent, or Firm* — Oliff PLC

(57) ABSTRACT

An information processing apparatus that generates an operation plan of a vehicle that is operable through rental in a plurality of different rental modes, includes: a storage section that stores usage record data on the vehicle by rental mode; and a control section that, based on the stored usage record data, estimates a utilization rate and sales of the vehicle when the vehicle is rented out, in each of the plurality of rental modes and in each of a plurality of time periods of day, and, based on both the estimated utilization rates and sales, generates the operation plan of the vehicle for each of the plurality of time periods of day.

20 Claims, 8 Drawing Sheets

(51) Int. Cl.
*G07C 5/02* (2006.01)
*G06Q 30/0645* (2023.01)
*G06Q 10/0633* (2023.01)
*G06Q 10/0631* (2023.01)

(58) Field of Classification Search
CPC .. G06Q 10/06314; G06Q 10/20; G06Q 50/30; G07C 5/02; G07B 15/00
See application file for complete search history.

(56) References Cited

U.S. PATENT DOCUMENTS

| | | | |
|---|---|---|---|
| 2009/0193055 A1* | 7/2009 | Kuberka | G06F 16/51 |
| 2015/0142494 A1* | 5/2015 | Yap | G06Q 10/06314 |
| | | | 705/7.18 |
| 2018/0231984 A1* | 8/2018 | Alonso-Mora | G05D 1/0291 |
| 2019/0206010 A1* | 7/2019 | Sharma | H04W 4/42 |
| 2019/0287034 A1 | 9/2019 | Mitsumaki et al. | |

FOREIGN PATENT DOCUMENTS

| | | | | |
|---|---|---|---|---|
| CN | 108520451 A | * | 9/2018 | |
| JP | 2019-164453 A | | 9/2019 | |
| WO | WO-2018080264 A1 | * | 5/2018 | ......... G06Q 30/0613 |
| WO | WO-2018080265 A1 | * | 5/2018 | ......... G06Q 10/0637 |

OTHER PUBLICATIONS

T. Tahmassebi, "An approach to Management of Multilevel Distribution Systems for Consumer Goods . . . Information Uncertainty", 1998, Computers Chem. Engineering, vol. 22, Suppl., pp. S263-S270. (Year: 1998).*

Michael K. Svangren, "Investigating the Use of an Online Peer-to-Peer Car Sharing Service", Aug. 2019, LNISA, vol. 11748, pp. 1-58. (Year: 2019).*

Olga Novikova, "The Sharing Economy and the Future of Personal Mobility: New Models based on Car Sharing," 2017, Technology Innovation Management Review, vol. 7, Issue 8, pp. 27-31. (Year: 2017).*

* cited by examiner

FIG. 2
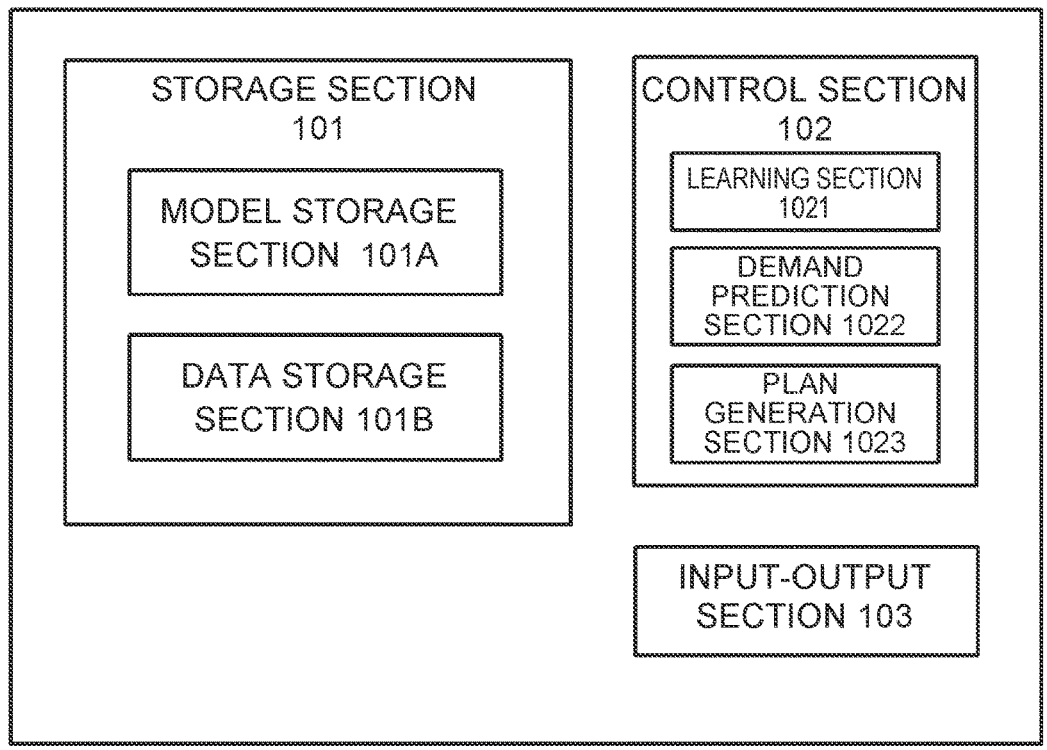
FIG. 3
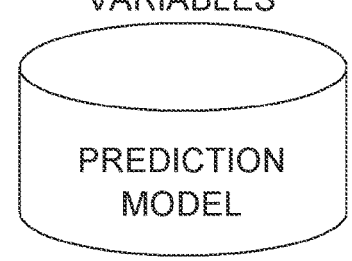
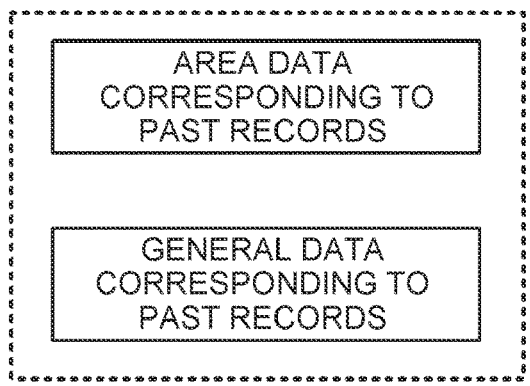

FIG. 5A

| PAST RECORD ID | RENTAL TYPE | START TIME | END TIME | ... | SALES |
|---|---|---|---|---|---|
| A001 | CAR SHARE | 8:15 | 8:45 | ... | 432 YEN |
| A002 | CAR SHARE | 9:00 | 10:00 | ... | 864 YEN |
| A003 | RIDE SHARE | 10:00 | 14:00 | ... | 2160 YEN |
| ... | ... | ... | ... | ... | ... |

FIG. 5B

| MESH ID | AREA TYPE | BUILDING 1 | | ... | BUILDING n | | ... |
| | | TYPE | CAPACITY | AREA | ... | TIME PERIOD OF DAY A | TRAFFIC VOLUME | ... |
|---|---|---|---|---|---|---|---|---|
| M001 | URBAN AREA | RAIL STATION | 3000 | ... | ... | ... | ... | ... |
| M002 | URBAN AREA | PUBLIC FACILITY | 4500 | ... | ... | ... | ... | ... |
| M003 | URBAN AREA | HOSPITAL | 300 | ... | ... | ... | ... | ... |
| ... | ... | ... | ... | ... | ... | ... | ... | ... |

FIG. 5C

| DATE | DAY OF WEEK | TIME PERIOD OF DAY | WEATHER | MESH ID | PAST RECORD ID | ... |
|---|---|---|---|---|---|---|
| 2019/7/1 | MONDAY | BETWEEN 13 AND 14 HOURS | CLOUDY | M001 | A001 | ... |
| 2019/7/1 | MONDAY | BETWEEN 14 AND 15 HOURS | CLOUDY | M002 | A002 | ... |
| 2019/7/1 | MONDAY | BETWEEN 15 AND 16 HOURS | CLOUDY | M003 | A003 | ... |
| ... | ... | ... | ... | ... | ... | ... |

INFORMATION PROCESSING APPARATUS FOR GENERATING A VEHICLE OPERATION PLAN IN A PLURALITY OF DIFFERENT RENTAL MODES

CROSS-REFERENCE TO RELATED APPLICATION

This application claims priority to Japanese Patent Application No. 2019-190379 filed on Oct. 17, 2019, incorporated herein by reference in its entirety.

BACKGROUND

1. Technical Field

The disclosure relates to a technique of generating an operation plan of a vehicle.

2. Description of Related Art

Vehicle utilization efficiency can be increased by sharing one vehicle among a plurality of users. One of such modes is a car sharing mode in which a vehicle can be rented out on a short-time-period basis (for example, for every 15 minutes) (Japanese Patent Application Publication No. 2019-164453). A characteristic of the car sharing mode is that while profitability per hour is relatively high, utilization rates of a vehicle decrease during hours of low demand.

On the other hand, mainly in Europe and the United State, a business model is developed in which earnings are generated by renting out a vehicle for a certain period to a user who conducts passenger transportation. Such a mode is referred to as ride sharing mode. In the ride sharing mode, although the utilization rate of a vehicle is high, profitability per hour is low, compared with the car sharing mode.

SUMMARY

The utilization rate and profitability of a vehicle change, depending on whether the vehicle is rented out to a plurality of users on a short-time-period basis, or the vehicle is rented out to one user who conducts passenger transportation for a certain period. To optimize the utilization rate and profitability of a vehicle, it is preferable that rental modes of the vehicle can be changed as appropriate.

The disclosure is made in light of the problem, and an object of the disclosure is to appropriately determine a mode of rental of a vehicle to a user.

An aspect of the disclosure is an information processing apparatus that generates an operation plan of a vehicle that is operable through rental in a plurality of different rental modes.

Specifically, the information processing apparatus includes: a storage section that stores usage record data on the vehicle by rental mode; and a control section that, based on the stored usage record data, estimates a utilization rate and sales of the vehicle when the vehicle is rented out, in each of the plurality of rental modes and in each of a plurality of time periods of day, and, based on both the estimated utilization rates and sales, generates the operation plan of the vehicle for each of the plurality of time periods of day.

Another aspect of the disclosure is an information processing method performed by an information processing apparatus that generates an operation plan of a vehicle that is operable through rental in a plurality of different rental modes.

Specifically, the information processing method includes: an acquisition step of acquiring usage record data on the vehicle by rental mode; an estimation step of, based on the acquired usage record data, estimating a utilization rate and sales of the vehicle when the vehicle is rented out, in each of the plurality of rental modes and in each of a plurality of time periods of day; and a generation step of, based on both the estimated utilization rates and sales, generating the operation plan of the vehicle for each of the plurality of time periods of day.

Still another aspect of the disclosure is a program for causing a computer to execute the information processing method performed by the information processing apparatus, or a computer-readable storage medium storing the program in a non-transitory manner.

According to the disclosure, a mode of rental of a vehicle to a user can be appropriately determined.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a schematic diagram of a configuration of an information processing apparatus according to a first embodiment;

FIG. 3 is a diagram for describing a method of learning a prediction model;

FIG. 5A is a diagram for describing the data stored in the data storage section;

FIG. 5B is a diagram for describing the data stored in the data storage section;

FIG. 5C is a diagram for describing the data stored in the data storage section;

DETAILED DESCRIPTION OF EMBODIMENTS

Figure 1:
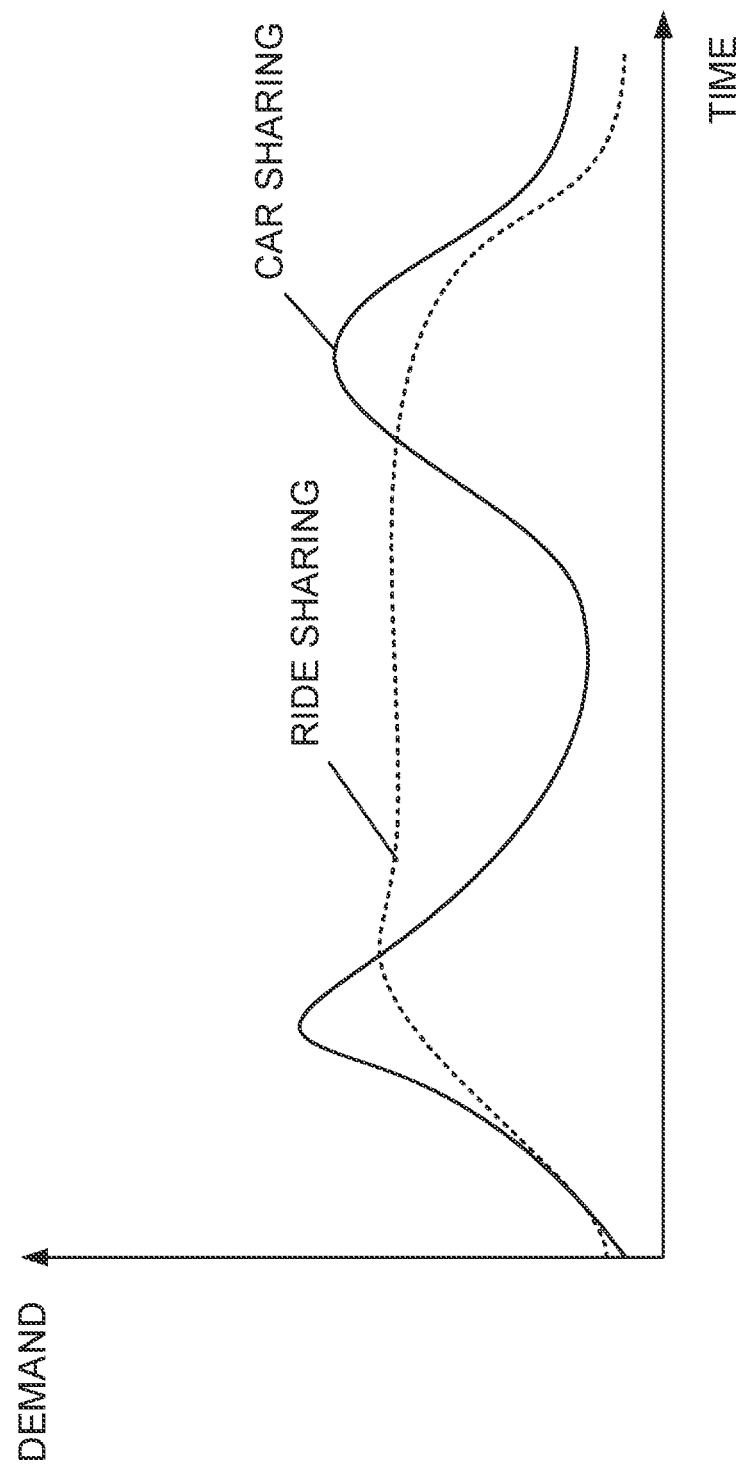
FIG. 1 shows changes in demand by rental mode.

There is a mode in which a mobility service is provided by renting out a vehicle to a user. For example, in recent years, a car sharing mode that enables a reservation on a short-time-period basis, such as for every 15 minutes, is used in many occasions.

On the other hand, in Europe and the United States, a business model is developed in which earnings are generated by renting out a vehicle to a user who conducts passenger transportation. Such a mode is referred to as ride sharing mode.

Business operators that rent out vehicles desire to enhance utilization rates and profitability of the vehicles. For example, shortcomings of the car sharing mode and the ride sharing mode can be compensated for by each other by operating a vehicle to be rented out in both the car sharing mode and the ride sharing mode.

However, since it varies depending on a time period of day and an area which of the car sharing mode and the ride sharing mode is demanded, there has been a problem that a vehicle cannot always be operated in an optimal mode.

To address such a problem, in an embodiment, an information processing apparatus is provided that generates an operation plan of a vehicle that is operable through rental in a plurality of different rental modes. The plurality of different rental modes are, for example, the car sharing mode and the ride sharing mode mentioned above, but may be other modes as long as the modes are modes used when a vehicle is rented out.

Specifically, the information processing apparatus includes: a storage section that stores usage record data on the vehicle by rental mode; and a control section that, based on the stored usage record data, estimates a utilization rate and sales of the vehicle when the vehicle is rented out, in each of the plurality of rental modes and in each of a plurality of time periods of day, and, based on both the estimated utilization rates and sales, generates the operation plan of the vehicle for each of the plurality of time periods of day.

The storage section stores the usage record data on the vehicle by rental mode. The usage record data is, for example, data including a date and time when the vehicle is rented out, sales, route information, the number of occupants, and the like.

The control section estimates the utilization rate and sales of the vehicle when the vehicle is operated in a certain rental mode, in each time period of day. Further, based on the estimated utilization rates and sales, the control section determines in which rental mode the vehicle is operated, in each time period of day. With such a configuration, it is possible to perform vehicle operation striking a balance between a utilization rate and sales.

Note that the operation plan may be a plan in which a rental mode of the vehicle is assigned in each time period of day. A result of such scheduling may be transmitted to the vehicle, a manager of the vehicle, an apparatus managing the vehicle, and the like.

The plurality of rental modes may include any of a ride sharing mode in which a transportation business is conducted by using the vehicle, and a car sharing mode in which the vehicle is rented out to a driver on a pay-by-time basis.

By appropriately switching between the ride sharing mode and the car sharing mode, the utilization rate and sales of the vehicle can be optimized.

The control section may calculate an evaluation value based on the estimated utilization rate and sales in each of the plurality of time periods of day, and, based on the evaluation values, generate the operation plan of the vehicle for each of the plurality of time periods of day.

The control section may determine the operation plan that maximizes the sum of the evaluation values in the plurality of time periods of day.

The evaluation values may be acquired, for example, by adding up respective weighted values of the utilization rates and the sales. A weighting method may be determined as appropriate, with a preference of a user reflected.

The control section may perform the estimation by using area information associated with a unit area where the vehicle is deployed.

In some cases, trends of usage of vehicles greatly change depending on a characteristic of an area where the vehicles are deployed. For example, in an area where a railway station exists, it is conceivable that more people use rideshare vehicles than in a residential area, and in an area where many houses exist, it is conceivable that more people use car-share vehicles than in a commercial area. Accordingly, by using information indicating a characteristic of an area (the area information), accuracy of a result of the estimation can be enhanced.

The estimation can be performed, for example, by using a machine learning model learned by using the usage record data and the area information corresponding to the vehicle.

The area information may include a plurality of elements associated with a facility or a building included in the unit area.

For example, information indicating, in the form of characteristic amounts, purposes of use and attributes of buildings included in the area, the number of the buildings, capacities of the buildings, and the like can serve as the area information.

The plurality of time periods of day may include a commuting time period of day and a non-commuting time period of day, and the plurality of time periods of day may include a time period of weekday and a time period of holiday.

By including time periods of day among which patterns of human movement change as described above, an efficient operation plan can be generated.

The control section may transmit the generated operation plan to an apparatus that manages a reservation of the vehicle, and may transmit the generated operation plan to an apparatus associated with a manager of the vehicle.

By transmitting the generated operation plan to the apparatus that manages a reservation of the vehicle, it is possible to accept reservations in accordance with the plan. By notifying the generated operation plan to the manager of the vehicle, it is easier to make a maintenance plan and the like for the vehicle.

First Embodiment

FIG. 1 is a diagram for describing demands for the car sharing mode and the ride sharing mode. In a present example, it is shown that the demand for car sharing increases in the commuting time periods of day in the morning and in the evening, and drops in the other time periods of day. Moreover, it is shown that the demand for ride sharing does not greatly change throughout the daytime. When such demands are expected, it is preferable for a business operator that rents out vehicles to operate more car-share vehicles during the commuting time periods of day and operate more ride-share vehicles during the daytime.

An information processing apparatus according to a first embodiment is an apparatus that determines such a rental mode of a vehicle in each time period of day.

The information processing apparatus according to the first embodiment predicts a demand for each rental mode, based on data indicating a past record of operation of the vehicle (past record data), and generates an operation plan that optimizes a utilization rate and sales of the vehicle, based on a result of the prediction.

FIG. 2 is a block diagram schematically showing an example of a configuration of an information processing apparatus 100 according to the first embodiment.

The information processing apparatus 100 includes a storage section 101, a control section 102, and an input-output section 103. The information processing apparatus 100 is configured by using a general computer including a processor and a memory.

The storage section 101 is means for storing data required for generating the operation plan. Specifically, the storage section 101 includes a model storage section 101A that stores a machine learning model for predicting demands, and a data storage section 101B that stores data for performing machine learning. Note that the storage section 101 may also store a program to be executed by the control section 102, which will be described later, data to be used by the program, and the like. The storage section 101 is configured by using a storage medium such as a RAM, a magnetic disk, or a flash memory.

The model storage section 101A stores the machine learning model (hereinafter, prediction model). FIG. 3 is a diagram for describing data to be used by the prediction model.

The prediction model in the embodiment is a machine learning model constructed by using information indicating past records provided by vehicles (hereinafter, past record data) as teacher data, and using information indicating a background of demand prediction as input data. The information processing apparatus 100 can perform a phase of learning a prediction model and a phase of predicting demands by using the prediction model.

The prediction model uses, for the information indicating the background of demand prediction, data related to an area serving as an operation base of the vehicle and general data such as weather and time periods of day. In the embodiment, the former data is referred to as area data, and the latter data is referred to as general data.

For example, a target area is divided into meshes, and the area data indicates characteristics of each mesh (for example, the numbers of facilities and buildings existing in each mesh, types of the facilities and buildings, the numbers of people that can be accommodated in the facilities and buildings, and the like). For example, the general data includes weather and temperature of the target area, time periods of day, and the like. The data is converted into characteristic amounts and used as explanatory variables.

Figure 4A:
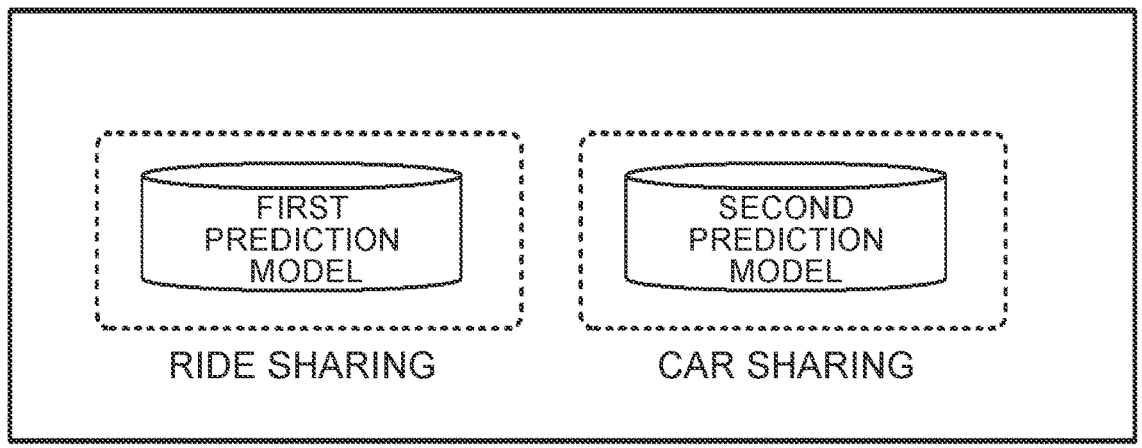
FIG. 4A is a diagram for describing data stored in a data storage section.

As shown in FIG. 4A, the model storage section 101A can store a different prediction model for each rental mode. In the embodiment, a first prediction model that predicts a demand for the ride sharing mode, and a second prediction model that predicts a demand for the car sharing mode are used. Each of the prediction models is constructed individually, based on past record data in the ride sharing mode and past record data in the car sharing mode, respectively.

The data storage section 101B includes databases that store the past record data, the area data, and the general data. The databases are constructed in such a manner that a program for a database management system (DBMS) to be executed by a processor manages data stored in a storage apparatus. The databases used in the embodiment are, for example, relational databases.

Figure 4B:
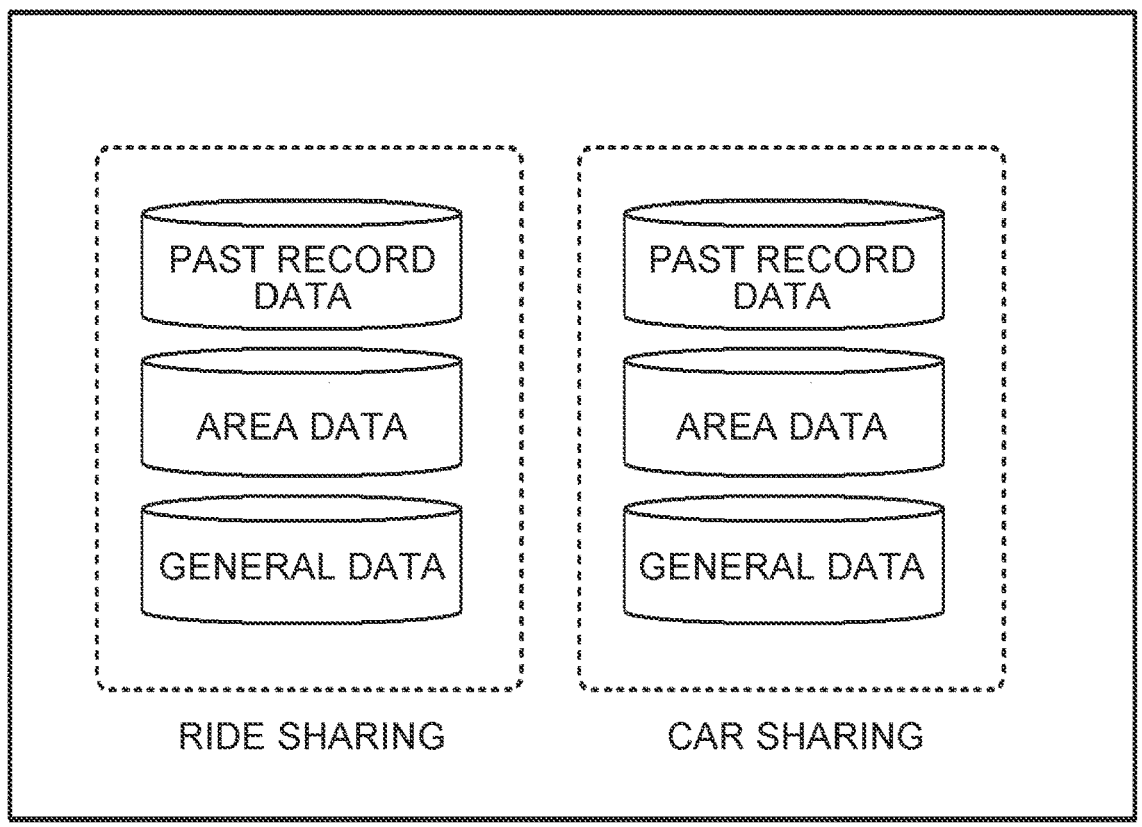
FIG. 4B is a diagram for describing data stored in a data storage section.

As shown in FIG. 4B, the data storage section 101B can also store a different dataset for each rental mode.

Next, details of the past record data, the area data, and the general data will be described. The data may be acquired from an outside of the apparatus via a storage medium or a network.

The past record data is data indicating a past record of provision of a service. FIG. 5A is an example of the past record data. The past record data is data in which, for example, a vehicle rental type, a rental start time, a rental end time, an amount of sales, and the like are indicated in numerical values. In addition, the past record data may also include the number of occupants during the rental, the number of pieces of luggage, a route of movement, and the like.

The area data is data indicating characteristics of an area (referring to a unit area; hereinafter, mesh) where the vehicle is deployed. FIG. 5B is an example of the area data. The area data is data in which, for example, the numbers of facilities and buildings existing in a mesh, types of the facilities and buildings (for example, school, commercial facility, hospital, station, and the like), the number of people that can be accommodated in the facilities and buildings (for example, the number of beds in case of a hospital, the number of students in case of a school, a capacity in case of an amusement facility, and the like), and the like are indicated in numerical values. In the embodiment, it is assumed that the target area is divided into a plurality of meshes beforehand.

The general data is data in which a date, a day of week, a time period of day, weather, temperature, and the like are indicated in numerical values. FIG. 5C is an example of the general data. The general data is data that is not directly related to the vehicle or the service.

The information processing apparatus 100 according to the embodiment constructs the first prediction model and the second prediction model by weighting the plurality of explanatory variables based on the data.

Note that in a description below, the characteristic amounts obtained by converting the past record data will be referred to as past record characteristic amounts, the characteristic amounts obtained by converting the area data will be referred to as area characteristic amounts, and the characteristic amounts obtained by converting the general data will be referred to as general characteristic amounts.

The control section 102 is a computing unit that controls functions included in the information processing apparatus 100. The control section 102 can be implemented by using a processing unit such as a CPU (Central Processing Unit).

The control section 102 includes three functional modules, namely, a learning section 1021, a demand prediction section 1022, and a plan generation section 1023. Each functional module may be implemented in such a manner that the CPU executes the program stored in the storage section 101.

The learning section 1021 constructs the first prediction model and the second prediction model by using the datasets stored in the data storage section 101B.

The demand prediction section 1022 predicts a demand for each rental mode in each time period of day by using each of the constructed prediction models.

Based on the predicted demands, the plan generation section 1023 generates an operation plan of the vehicle, that is, a plan in which it is indicated, for each time period of day, whether the target vehicle is operated as a car-share vehicle or is operated as a ride sharing vehicle.

Specific contents of processing performed by each functional module will be described.

Figure 6:
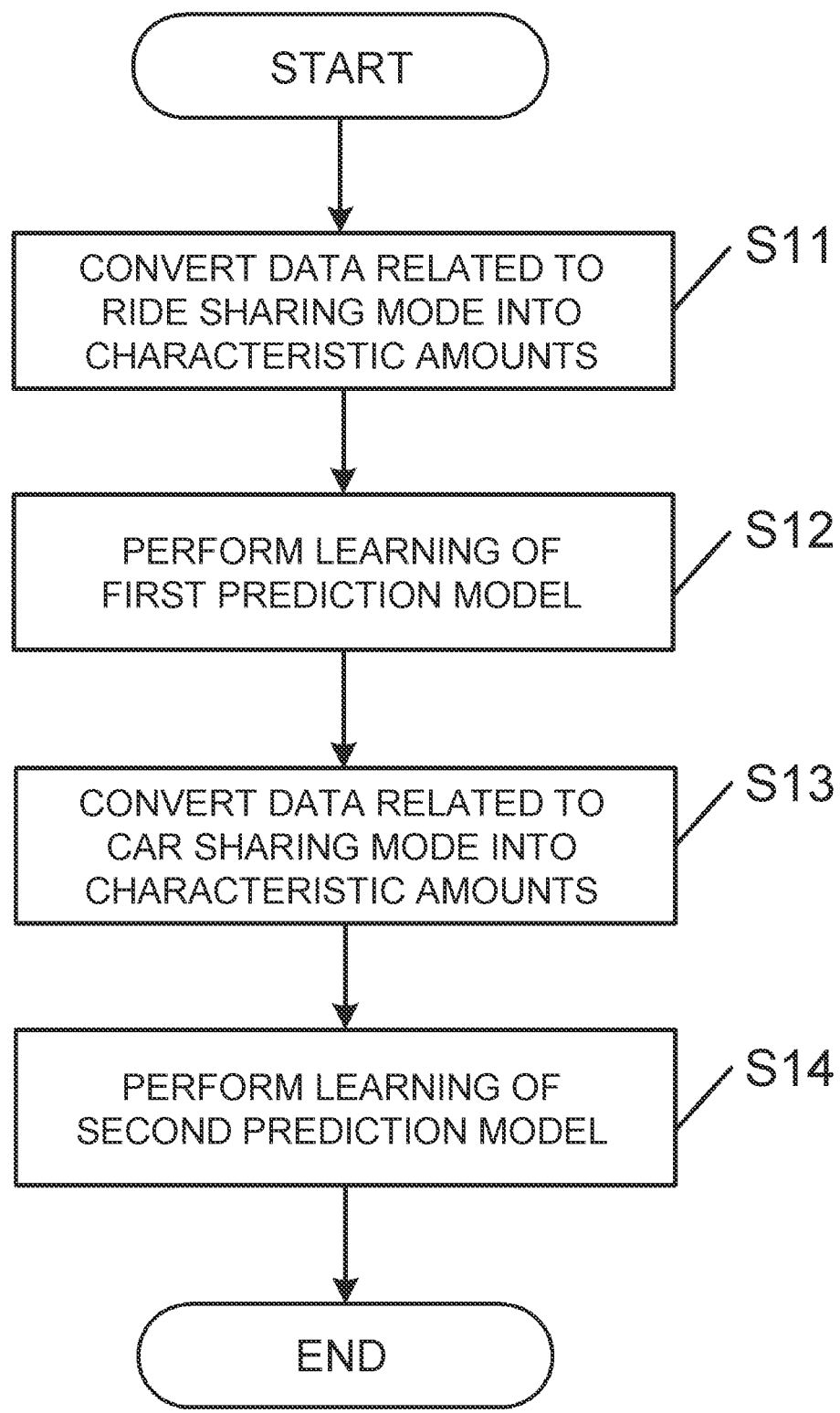
FIG. 6 is a flowchart of processing for causing prediction models to be learned.

First, a method of constructing the prediction models, which is performed by the learning section 1021, will be described. FIG. 6 is a flowchart for describing processing of constructing the prediction models (learning phase).

In the learning phase, the learning section 1021 learns the prediction models by using the past record characteristic amounts, and area characteristic amounts and general characteristic amounts corresponding to past records of interest. Here, it is assumed that past records of rental of the vehicle exist, and that related data (past record data, area data, general data) are stored in the data storage section 101B.

First, in step S11, data corresponding to the ride sharing mode is extracted from the stored past record data and converted into past record characteristic amounts. Records in the area data corresponding to past records of interest are converted into area characteristic amounts, and records in the general data corresponding to the past records of interest are converted into general characteristic amounts.

In step S12, learning of the first prediction model is performed by using the characteristic amounts. The area characteristic amounts and the general characteristic amounts serve as explanatory variables, and the past record characteristic amounts serve as objective variables.

Subsequently, in step S13, the learning section 1021 extracts data corresponding to the car sharing mode from the stored past record data and converts the extracted data into past record characteristic amounts. Records in the area data corresponding to past records of interest are converted into area characteristic amounts, and records in the general data corresponding to the past records of interest are converted into general characteristic amounts.

In step S14, learning of the second prediction model is performed by using the characteristic amounts.

Through the processing described here, weights for the explanatory variables to produce the objective variables are updated.

Figure 7:
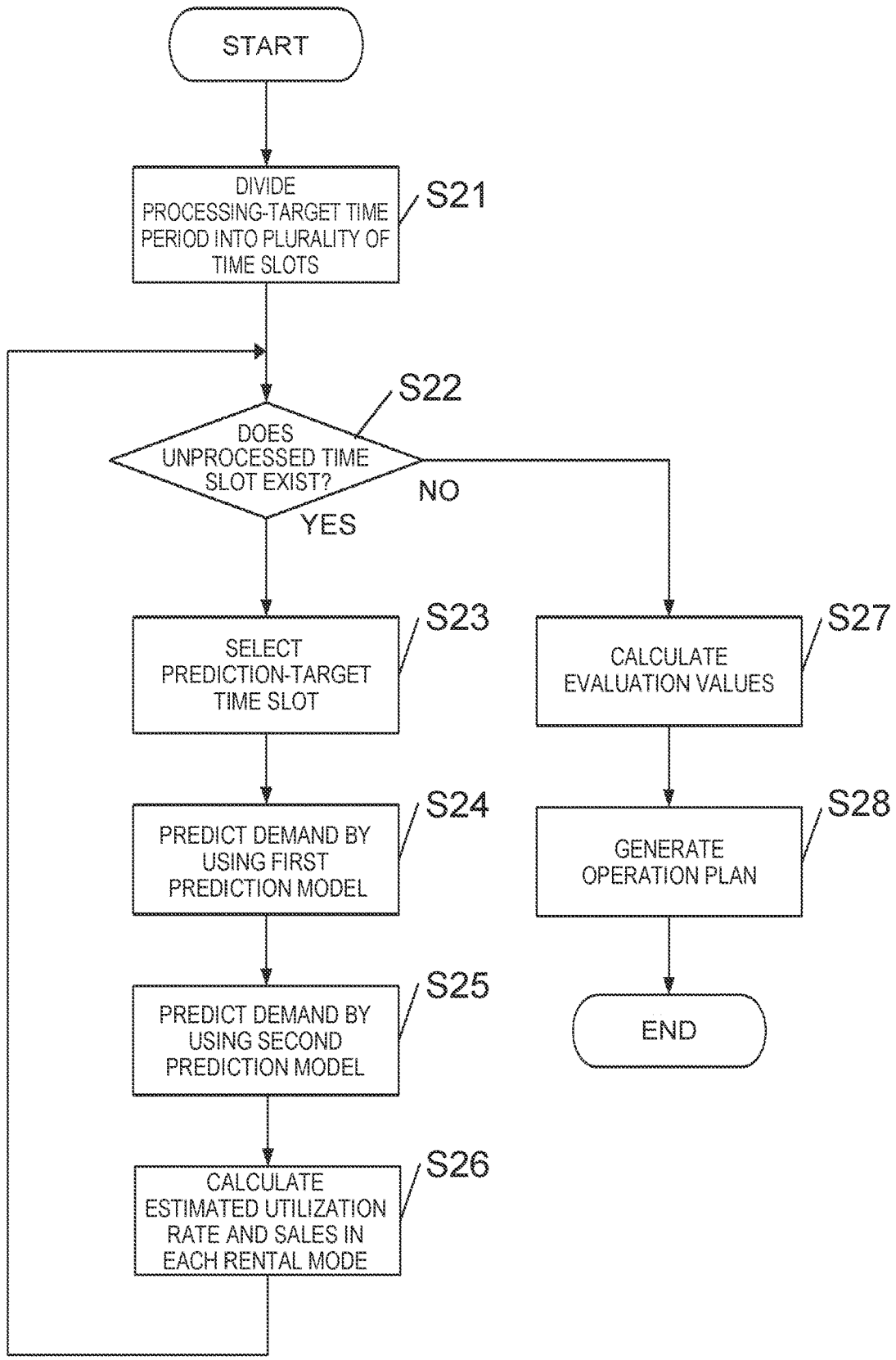
FIG. 7 is a flowchart of processing for generating an operation plan.

Next, a description will be given of a method in which the demand prediction section 1022 predicts demands and the plan generation section 1023 generates an operation plan of the vehicle based on a result of the prediction. FIG. 7 is a flowchart for describing the processing. Note that it is assumed here that area characteristic amounts and general characteristic amounts corresponding to conditions of performing demand prediction are prepared beforehand.

First, in step S21, the plan generation section 1023 divides a target time period for which prediction is performed into a plurality of time slots. For example, when it is desired to generate an operation plan on an every 30-minute basis, one day is divided by a 30-minute period into 48 time slots. When a prediction-target time period is one week, 336 time slots are obtained.

The time slots may include a commuting time period of day and a non-commuting time period of day, and may include time periods of weekday and time periods of holiday. By including time periods of day among which demands greatly change, effects brought about by changing the rental modes can be enhanced.

Subsequently, in step S22, the plan generation section 1023 determines whether or not any unprocessed time slot exists. Here, when unprocessed time slots exist, then in step S23, a target unprocessed time slot for which prediction is performed is sequentially selected.

Subsequently, in step S24, the demand prediction section 1022 predicts a demand in the target time slot by using the first prediction model. In step S25, the demand prediction section 1022 predicts a demand in the target time slot by using the second prediction model.

Figure 8:
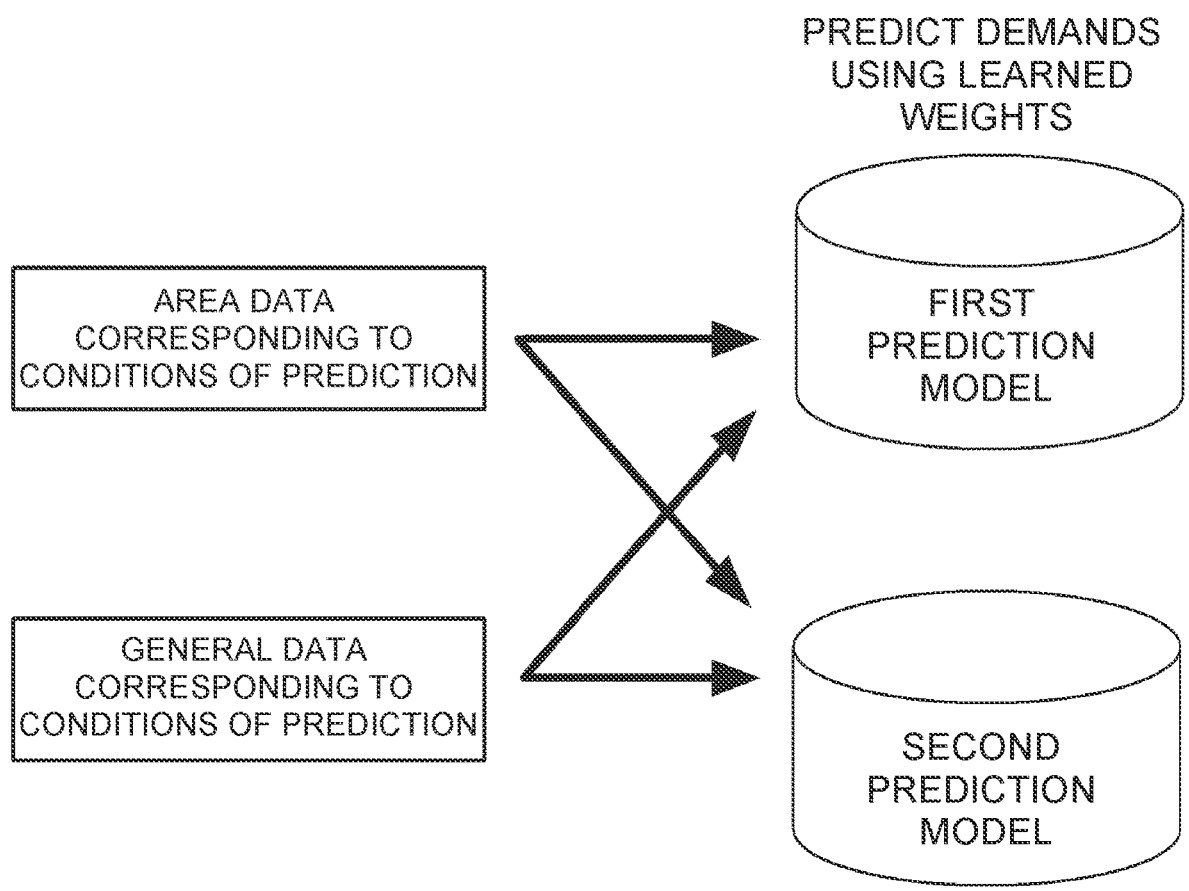
FIG. 8 is a diagram for describing a demand estimation method using the prediction models.

Note that when a demand is predicted, the area data and the general data corresponding to the conditions of prediction are used as data input into the models, as shown in FIG. 8. For example, the area data can be data related to a mesh where the target vehicle for which prediction is performed is deployed. The general data is data specifying the time slot for which prediction is performed, but may include another element. For example, the general data may include data related to estimated weather, temperature, and the like in the period for which prediction is performed.

Through the processing in steps S24 and S25, demands estimated when the vehicle is operated in the ride sharing mode and the car sharing mode can be obtained.

Subsequently, in step S26, the plan generation section 1023 calculates utilization rates and sales of the vehicle, based on the demands estimated for each rental mode. A utilization rate of the vehicle is a proportion of a rental time period of the vehicle to a time slot. For example, when rental for 15 minutes is estimated in a 30-minute time slot, the utilization rate of the vehicle in the time slot is 50%.

The sales are an amount of money charged in a time slot of interest. For example, in a case where a charge is collected when the vehicle is returned, sales are recorded when it is estimated that the vehicle is returned in the processing-target time slot. The sales are an amount of money paid by a user who has rented the vehicle as a fee for using the vehicle. Note that in the ride sharing mode, a case of paying a fee according to a time period for which the vehicle is rented and a case of paying a fee according to sales for passenger transportation are conceivable. In the latter case, the sales may be an amount of money obtained after expenses (for example, pay to a driver and the like) are deducted from gross sales for passenger transportation.

The processing described above is repeated, whereby "predictions on a utilization rate and sales when the target vehicle is operated in the ride sharing mode" and "predictions on a utilization rate and sales when the target vehicle is operated in the car sharing mode" can be obtained for each time slot.

When the processing is completed with respect to all time slots, the processing moves to step S27.

In step S27, the plan generation section 1023 calculates an evaluation value for each rental mode in each time slot, for example, via an expression below:

$$\text{Evaluation value} = \text{utilization rate} \times \text{coefficient 1} + \text{sales} \times \text{coefficient 2} \qquad \text{Expression (1)}$$

where the coefficient 1 and the coefficient 2 are respective weights for the elements. The coefficients may be specified by a user beforehand, or may be fixed values. The coefficients may be determined as appropriate, depending on whether greater importance is placed on the utilization rate, or greater importance is placed on the sales.

Figure 9:
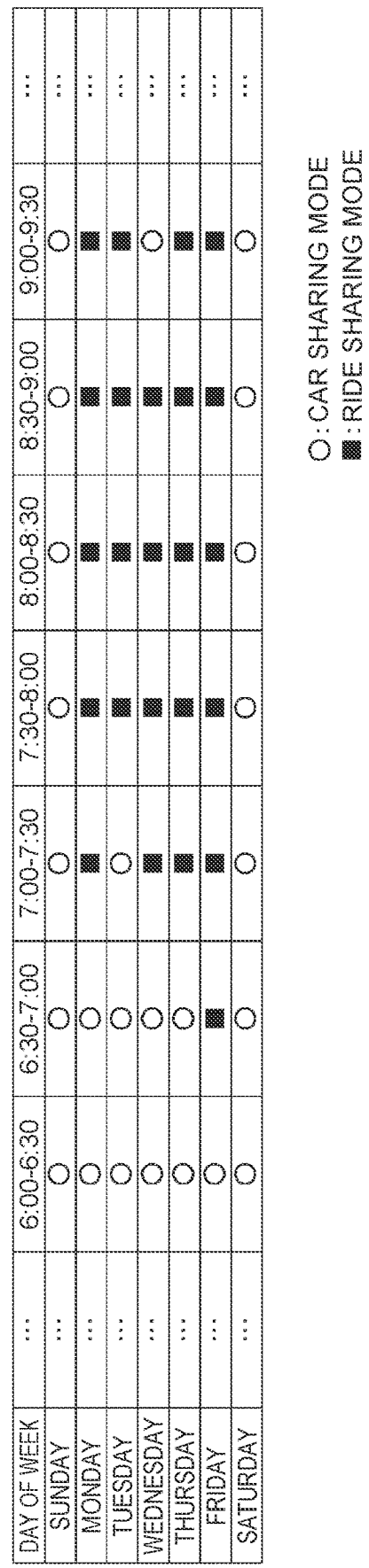
FIG. 9 shows an example of the generated operation plan.

Subsequently, in step S28, a rental mode in each time slot is determined, based on the calculated evaluation values. An operation plan of the target vehicle is determined by selecting rental modes in all time slots. In the present step, for example, a rental mode obtaining a larger evaluation value is assigned in each time slot. FIG. 9 is an example of the determined operation plan.

As described above, for a vehicle that can take a plurality of different rental modes, the information processing apparatus according to the embodiment predicts demands in each time slot, and determines a rental mode in each time slot based on both utilization rates and sales. With such a configuration, increasing and decreasing demands for each rental mode can be followed, so that it is possible to enhance both the utilization rate and the sales of the vehicle.

Modification Example 1

In the first embodiment, the information processing apparatus 100 generates an operation plan of a vehicle. The generated operation plan may be transmitted to an external apparatus that manages the vehicle. For example, after step S28 is performed, the generated operation plan may be transmitted to an apparatus that manages rental/reservations and the like of a plurality of vehicles. When the information processing apparatus 100 itself is an apparatus that manages rental/reservations and the like of the vehicle, the operation plan may be transmitted to a module that manages reservations.

When a business operator or an owner that owns or manages the vehicle exists separately, the generated operation plan may be transmitted to an apparatus associated with the business operator or the owner. The business operator or the owner can appropriately make a maintenance plan and the like by knowing how the vehicle is used.

Modification Example 2

In the first embodiment, a rental mode is determined in each time slot. However, in some cases, it may be disadvantageous to a user if the rental modes are frequently changed. For example, when the rental modes are changed in every 30 minutes, some users who want to use car sharing for more than 30 minutes may give up using car sharing. To prevent such a case, a minimum time period for which the same rental mode continues may be provided. For example, when a time period of day exists in which car sharing is used for 60 minutes on average, a configuration may be made such that the car sharing mode is continuously used for at least 60 minutes in the time period of day.

Modification Example 3

Although a rental mode in each time slot is sequentially determined in the first embodiment, all patterns of combinations of the rental modes may be generated and thereafter evaluated individually, and an optimal pattern may be selected. In such a case, a sum of evaluation values may be calculated for each pattern, and a pattern obtaining the largest sum of the evaluation values may be adopted as the optimal pattern.

OTHER MODIFICATION EXAMPLES

The embodiment described above is an example in every respect, and the disclosure can be worked by making changes as appropriate without departing from the gist of the disclosure. For example, the processing and the means described in the disclosure can be freely combined to be performed or implemented to the extent that no technical inconsistency occurs.

Although the ride sharing mode and the car sharing mode are illustrated in the description of the embodiment, other rental modes can be used.

Although the term "ride sharing mode" is used in the description of the embodiment, a plurality of occupants are not necessarily needed in the ride sharing mode. In other words, the ride sharing mode may be a mode in which rental of a vehicle to a user who conducts passenger transportation allows the user to conduct business operation of an owner-driven taxi.

Although the estimation is performed by day of week and by time period of day as shown in FIG. 9 in the description of the embodiment, time slots for each of which the estimation is performed may be others than the time slots illustrated.

The processing described as being performed by a single apparatus may be performed by a plurality of apparatuses in a divided manner. Alternatively, the processing described as being performed by different apparatuses may be performed by a single apparatus. In a computer system, it can be flexibly changed what hardware component or components (a server component or components) are used to implement each function.

The disclosure can also be implemented in such a manner that a computer program packaging the functions described in the embodiment is provided to a computer, and one or more processors included in the computer read and execute the program. Such a computer program may be provided to the computer by using a non-transitory computer-readable storage medium that can connect to a system bus of the computer, or may be provided to the computer via a network. The non-transitory computer-readable storage medium includes, for example, any types of disks such as magnetic disks (floppy (R) disk, hard disk drive (HDD), and the like) and optical discs (CD-ROM, DVD disc, Blu-ray Disc, and the like), a read-only memory (ROM), a random-access memory (RAM), an EPROM, an EEPROM, a magnetic card, a flash memory, an optical card, and any types of media suitable to store electronic instructions.

What is claimed is:

1. An information processing method performed by an information processing apparatus that generates an operation plan of a vehicle that is operable through rental in a plurality of different rental modes including a ride sharing mode and a car sharing mode, the method comprising:
   a step of acquiring, from a memory, (i) past usage record data on the vehicle by rental mode, (ii) area data representing characteristics of an area where the vehicle was used including an area type and a number of certain facilities in the area, and (iii) general data representing general characteristics of a day in which the vehicle was used including weather;
   a step of extracting, from among the past usage record data stored in the memory, first use record related to the ride sharing mode;
   a step of extracting, from among the area data stored in the memory, first area record corresponding to the extracted first use record;
   a step of extracting, from among the general data stored in the memory, first general record corresponding to the extracted first use record;
   a step of performing learning of a first prediction model using the extracted first area record and the extracted first general record as explanatory variables and using the extracted first use record as an objective variable;
   a step of extracting, from among the past usage record data stored in the memory, second use record related to the car sharing mode;
   a step of extracting, from among the area data stored in the memory, second area record corresponding to the extracted second use record;
   a step of extracting, from among the general data stored in the memory, second general record corresponding to the extracted second use record;
   a step of performing learning of a second prediction model using the extracted second area record and the extracted second general record as explanatory variables and using the extracted second use record as an objective variable;
   a step of estimating, based on the first prediction model and the second prediction model, utilization rate and sales of the vehicle when the vehicle is rented out, in each of the plurality of rental modes and in each of a plurality of time periods of day; and
   a step of generating, based on both the estimated utilization rates and sales, the operation plan of the vehicle indicating, for each of the plurality of time periods of day, whether the vehicle is operated in the ride sharing mode or in the car sharing mode.

2. The information processing method according to claim 1, wherein in the step of generating, an evaluation value based on the estimated utilization rate and sales is calculated in each of the plurality of time periods of day, and, based on the evaluation values, the operation plan of the vehicle for each of the plurality of time periods of day is generated.

3. The information processing method according to claim 2, wherein in the step of generating, the operation plan that maximizes a sum of the evaluation values in the plurality of time periods of day is determined.

4. The information processing method according to claim 1, wherein in the area data is associated with a unit area where the vehicle is deployed.

5. The information processing method according to claim 1, wherein the first and second prediction models are each a machine learning model, and the information processing apparatus performs a phase of learning the first and second prediction models and a phase of predicting demands by using the first and second prediction models.

6. The information processing method according to claim 4, wherein the area data includes a plurality of elements associated with a facility or a building included in the unit area.

7. A non-transitory computer readable medium storing a program for causing a computer to execute the information processing method according to claim 1.

8. An information processing apparatus that generates an operation plan of a vehicle that is operable through rental in a plurality of different rental modes including a ride sharing mode and a car sharing mode, comprising:
a memory that stores (i) past usage record data on the vehicle by rental mode, (ii) area data representing characteristics of an area where the vehicle was used including an area type and a number of certain facilities in the area, and (iii) general data representing general characteristics of a day in which the vehicle was used including weather; and
a processor programmed to:
from among the past usage record data stored in the memory, extract first use record related to the ride sharing mode;
from among the area data stored in the memory, extract first area record corresponding to the extracted first use record;
from among the general data stored in the memory, extract first general record corresponding to the extracted first use record;
perform learning of a first prediction model using the extracted first area record and the extracted first general record as explanatory variables and using the extracted first use record as an objective variable;
from among the past usage record data stored in the memory, extract second use record related to the car sharing mode;
from among the area data stored in the memory, extract second area record corresponding to the extracted second use record;
from among the general data stored in the memory, extract second general record corresponding to the extracted second use record;
perform learning of a second prediction model using the extracted second area record and the extracted second general record as explanatory variables and using the extracted second use record as an objective variable; and
based on the first prediction model and the second prediction model, estimate a utilization rate and sales of the vehicle when the vehicle is rented out, in each of the plurality of rental modes and in each of a plurality of time periods of day, and, based on both the estimated utilization rates and sales, generate the operation plan of the vehicle indicating, for each of the plurality of time periods of day, whether the vehicle is operated in the ride sharing mode or in the car sharing mode.

9. The information processing apparatus according to claim 8, wherein the operation plan is a plan in which a rental mode of the vehicle is assigned in each time period of day.

10. The information processing apparatus according to claim 8, wherein the ride sharing mode is a mode in which a transportation business is conducted by using the vehicle, and the car sharing mode is a mode in which the vehicle is rented out to a driver on a pay-by-time basis.

11. The information processing apparatus according to claim 8, wherein the processor calculates an evaluation value based on the estimated utilization rate and sales in each of the plurality of time periods of day, and, based on the evaluation values, generates the operation plan of the vehicle for each of the plurality of time periods of day.

12. The information processing apparatus according to claim 11, wherein the processor determines the operation plan that maximizes a sum of the evaluation values in the plurality of time periods of day.

13. The information processing apparatus according to claim 8, wherein the area data is associated with a unit area where the vehicle is deployed.

14. The information processing apparatus according to claim 8, wherein the first and second prediction models are each a machine learning model, and the processor performs a phase of learning the first and second prediction models and a phase of predicting demands by using the first and second prediction models.

15. The information processing apparatus according to claim 13, wherein the area data includes a plurality of elements associated with a facility or a building included in the unit area.

16. The information processing apparatus according to claim 8, wherein the past usage record data includes data on time when the vehicle is used and associated sales amount.

17. The information processing apparatus according to claim 8, wherein the plurality of time periods of day include a commuting time period of day and a non-commuting time period of day.

18. The information processing apparatus according to claim 8, wherein the plurality of time periods of day include a time period of weekday and a time period of holiday.

19. The information processing apparatus according to claim 8, wherein the processor transmits the generated operation plan to an apparatus that manages a reservation of the vehicle.

20. The information processing apparatus according to claim 8, wherein the processor transmits the generated operation plan to an apparatus associated with a manager of the vehicle.

* * * * *